US012478610B2

(12) United States Patent
Malka et al.

(10) Patent No.: US 12,478,610 B2
(45) Date of Patent: Nov. 25, 2025

(54) COMPOSITIONS OF TRYPTOPHOL DERIVATIVES AND 4-ETHYL-PHENOL DERIVATIVES, AND METHODS OF USING SAME (71) Applicant: B. G. Negev Technologies and Applications Ltd., at Ben-Gurion University, Be'er Sheva (IL)

(72) Inventors: Orit Malka, Beer Sheva (IL); Raz Jelinek, Reut (IL); Elena Voronov, Beer Sheva (IL)

(73) Assignee: Orit Malka, Beer Sheva (IL)

( * ) Notice: Subject to any disclaimer, the term of this patent is extended or adjusted under 35 U.S.C. 154(b) by 573 days.

(21) Appl. No.: 17/922,790

(22) PCT Filed: May 11, 2021

(86) PCT No.: PCT/IL2021/050533
§ 371 (c)(1),
(2) Date: Nov. 2, 2022

(87) PCT Pub. No.: WO2021/229566
PCT Pub. Date: Nov. 18, 2021

(65) Prior Publication Data
US 2023/0172905 A1 Jun. 8, 2023

Related U.S. Application Data (60) Provisional application No. 63/132,619, filed on Dec. 31, 2020, provisional application No. 63/022,598, filed on May 11, 2020.

(51) Int. Cl.
*A61K 31/404* (2006.01)
*A61K 31/222* (2006.01)
*A61P 3/10* (2006.01)
*A61P 7/02* (2006.01)

(52) U.S. Cl.
CPC .......... *A61K 31/404* (2013.01); *A61K 31/222* (2013.01); *A61P 3/10* (2018.01); *A61P 7/02* (2018.01)

(58) Field of Classification Search
CPC .................................................. A61K 31/404
See application file for complete search history.

(56) References Cited

U.S. PATENT DOCUMENTS

2014/0271606 A1  9/2014  Sim

FOREIGN PATENT DOCUMENTS

| WO | WO/1999/033800 | 7/1999 |
| WO | WO/2005/033112 | 4/2005 |
| WO | WO 2007/093880 A1 | 8/2007 |
| WO | WO 2020/031191 A1 | 2/2020 |

OTHER PUBLICATIONS

Search Report for International Application No. PCT/IL2021/050533 dated Jul. 26, 2021.
Karon BS. "Why is everyone so excited about thromboelastrography (TEG)?" Clinica chimica acta. Sep. 25, 2014;436:143-8.
Smith et al. "Polyphosphate modulates blood coagulation and fibrinolysis" Proceedings of the National Academy of Sciences. Jan. 24, 2006;103(4):903-8.
European Search Report issued for Correspondence EP Application No. EP 21804303, dated Apr. 18, 2024.
Fragopoulou, E., Nomikos, T., Karantonis, H. C., Apostolakis, C., Pliakis, E., Samiotaki, M., . . . & Antonopoulou, S. (2007). Biological activity of acetylated phenolic compounds. *Journal of agricultural and food chemistry*, 55(1), 80-89.
Kawashima, A., Seto, H., Kato, I., Yasuda, A., Uchida, K., & Otake, N. (1985). Preparation of Fluorinated Antibiotics Followed By 19F NMR Spectroscopy II. Fluorinated Actinomycins. The Journal of Antibiotics, 38(11), 1625-1628.

*Primary Examiner* — Nizal S Chandrakumar
(74) *Attorney, Agent, or Firm* — Mark S Cohen; PEARL COHEN ZEDEK LATZER BARATZ LLP (57) ABSTRACT The present invention is directed to a composition including a Tryptophol derivative, a 4-Ethyl-Phenol derivative, or a combination thereof, and a method of using same, such as for treating a subject in need of modulation of blood coagulation.

7 Claims, 4 Drawing Sheets

Sample description
1 – diabetes+molec 400
2 – diabetes_tbs
3 – diabetes+molec 1200

COMPOSITIONS OF TRYPTOPHOL DERIVATIVES AND 4-ETHYL-PHENOL DERIVATIVES, AND METHODS OF USING SAME

CROSS-REFERENCE TO RELATED APPLICATIONS

This application is a National Phase Application of PCT International Application No. PCT/IL2021/050533, International Filing Date May 11, 2021, claiming the benefit of U.S. Patent Applications Nos. 63/022,598, filed May 11 2020, and 63/132,619, filed Dec. 31, 2020, which are hereby incorporated by reference.

FIELD OF THE INVENTION

The present invention, in some embodiments thereof, is directed to compounds, compositions comprising same, and methods of using same, such as for treating sepsis, inducing blood coagulation, among others.

BACKGROUND

A plethora of natural functional biomaterials are under development in medical research facilities worldwide, aimed at tackling a wide variety of pathophysiological conditions. Blood coagulation is initiated by platelet aggregation, followed by either a tissue factor (extrinsic) or by the contact activated (intrinsic) pathways, in both cases involving clotting protein activation that leads to thrombin formation (common pathway), which then, among its various activities, facilitates fibrin mesh deposition and sealing of the leakage. Uncontrolled bleeding can be a life-threatening problem for people with a coagulation deficiency such as hemophilia and can also be a complication for patients undergoing anticoagulant therapy. Rapid normalization of abnormal coagulation usually requires the administration of missing coagulation factors or the administration of specific antidotes.

On the other hand, hypercoagulation may also lead to a life threating condition resulting from the formation of blot clots, such as in the cases of ischemic stroke, heart attack, and limb loss, to name a few.

There is still a great need for compositions and methods of using same, such as for treating a subject in need of modulation of blood clotting.

SUMMARY

The present invention, in some embodiments, is based, in part, on the findings that a composition comprising a Tryptophol derivative and a 4-Ethyl-Phenol derivative effectively accelerated blood clotting in a murine model organism.

Further, the present invention, in some embodiments, is based on the findings that the composition comprising a Tryptophol derivative and a 4-Ethyl-Phenol derivative was found to effectively accelerate blood clotting in a blood sample of a healthy human subject, while effectively deaccelerate blood clotting a blood sample of a diabetic human subject.

Therefore, it suggested that a mixture of Tryptophol derivative and a 4-Ethyl-Phenol derivative is suitable for blood coagulation rectification in a subject in need thereof. As shown herein, this balancing combination effectively: (1) increased blood coagulation parameters in a subject in need of such increasing, e.g., hemorrhaging or bleeding; and (2) reduced blood coagulation parameters in a subject in need of such reduction, e.g., in the case of diabetes.

According to a first aspect, there is provided a method for modulating blood coagulation in a subject in need thereof, comprising administering to the subject a therapeutically effective amount of a composition comprising a Tryptophol derivative and a 4-Ethyl-Phenol derivative, or a combination thereof, thereby modulating blood coagulation in the subject.

According to another aspect, there is provided a composition comprising a Tryptophol derivative, a 4-Ethyl-Phenol derivative, or a combination thereof, and an acceptable carrier, for use in the modulation of blood coagulation in a subject in need thereof.

In some embodiments, the modulating comprises increasing or reducing.

In some embodiments, increasing or reducing blood coagulation comprises reducing or increasing the clot reaction time, respectively, in the subject, compared to control.

In some embodiments, increasing blood coagulation is in a subject being afflicted with trauma.

In some embodiments, increasing blood coagulation is in a subject being afflicted with blood loss.

In some embodiments, increasing blood coagulation is in a subject is afflicted with a disease characterized by reduced blood coagulation.

In some embodiments, the disease comprises hemophilia.

In some embodiments, reducing blood coagulation is in a subject being afflicted with a disease characterized by increased risk for developing blood clots.

In some embodiments, the disease comprises diabetes.

In some embodiments, the Tryptophol derivative is Tryptophol acetate.

In some embodiments, the 4-Ethyl-Phenol derivative is Tyrosol acetate.

In some embodiments, the composition is a pharmaceutical composition or a nutraceutical composition.

In some embodiments, the composition comprises a Tryptophol derivative and a 4-Ethyl-Phenol derivative.

In some embodiments, the Tryptophol derivative and the 4-Ethyl-Phenol derivative are present in the composition in a molar ratio ranging from 10:1 (m:m) to 1:10 (m:m).

In some embodiments, the Tryptophol derivative is Tryptophol acetate.

In some embodiments, the 4-Ethyl-Phenol derivative is Tyrosol acetate.

In some embodiments, the composition is a pharmaceutical composition or nutraceutical composition.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Further embodiments and the full scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE FIGURES

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

DETAILED DESCRIPTION

The present invention is some embodiments, is directed to compositions comprising a Tryptophol derivative, a 4-Ethyl-Phenol derivative, or a combination thereof, for use in the treatment of a subject in need of therapy, such as described herein.

Methods of Use

According to some embodiments, there is provided a method for modulating blood coagulation in a subject in need thereof, comprising administering to the subject a therapeutically effective amount of a composition comprising a Tryptophol derivative, a 4-Ethyl-Phenol derivative, or a combination thereof.

According to some embodiments, there is provided a method for treating a subject in need of modulation of blood coagulation, comprising administering to the subject a therapeutically effective amount of a composition comprising a Tryptophol derivative, a 4-Ethyl-Phenol derivative, or a combination thereof.

In some embodiments, modulating comprises increasing or reducing.

As used herein, the term "increasing" is interchangeable with "enhancing" and "elevating".

As used herein, the term "reducing" is interchangeable with "decreasing" and "inhibiting", and "lowering".

In some embodiments, the increasing or reducing blood coagulation comprises increasing or reducing a clot reaction time in the subject.

In some embodiments, the increasing or reducing is compared to a control.

In some embodiments, a control comprises a healthy subject or a sample derived or obtained therefrom. In some embodiments, a control comprises an untreated subject. In some embodiments, a control comprises a sample derived or obtained from a subject being treated according to the herein disclosed method, wherein the sample is collected or isolated from the subject prior to the treatment. In some embodiments, a sample comprises a biological sample, such as obtained or derived from a subject. Obtaining a biological sample is well within the capabilities of a skilled artisan.

In some embodiments, increasing blood coagulation comprises decreasing, reducing, or shortening the clot reaction time in the subject.

In some embodiments, the method comprises increasing blood coagulation in a subject being afflicted with trauma. In some embodiments, the method comprises increasing blood coagulation in the subject being afflicted with blood loss. In some embodiments, the method comprises increasing blood coagulation in a subject afflicted with a disease characterized by reduced blood coagulation.

In some embodiments, the subject is afflicted with trauma. In some embodiments, the subject is afflicted with blood loss. In some embodiments, the subject is afflicted with a disease characterized by reduced blood coagulation. In some embodiments, the subject is afflicted with a disease selected from: hemophilia or Van Willebrand disease. In some embodiments, the method comprises reducing the clot reaction time in a subject being afflicted with trauma. In some embodiments, the method comprises reducing the clot reaction time in the subject being afflicted with blood loss. In some embodiments, the method comprises reducing the clot reaction time in a subject afflicted with a disease characterized by reduced blood coagulation.

As used herein, the term "disease characterized by reduced blood coagulation" refers to any disease or disorder wherein the afflicted subject is characterized by reduced coagulation or parameters thereof, as described herein, compared to: a healthy subject, the overall population average, or both, both of which would be apparent to a skilled physician.

As used herein, the term "disease characterized by increased risk for developing blood clots" refers to any disease or disorder wherein the afflicted subject is characterized by increased coagulation or parameters thereof, as described herein, e.g., probability and/or frequency of blot clotting formation (thrombosis) compared to: a healthy subject, the overall population average, or both, both of which would be apparent to a skilled physician.

In some embodiments, a disease characterized by reduced blood coagulation is selected from: hemophilia or Van Willebrand disease.

Types of injuries that are classified as "trauma" would be apparent to one of ordinary skill in the art, inclusive of methods for determining same.

Types of diseases related to blood coagulation would be apparent to a skilled physician, including methods for determining same. None-limiting examples for such determination methods include, but are not limited to, family history check (e.g., abnormal blood clotting at a young age, Thrombosis in unusual locations, idiopathic blood clots, recurring blood, frequent miscarriages, stroke at a young age, etc.) and laboratory tests (e.g., PT-INR, aPTT, Fibrinogen level, CBC, Antithrombin activity, etc.).

In some embodiments, decreasing blood coagulation comprises increasing, elongating, or prolonging the clot reaction time in the subject.

In some embodiments, the method comprises decreasing blood coagulation in a subject being afflicted with a disease characterized by increased risk for developing blood clots. In some embodiments, the method comprises decreasing blood coagulation in a subject being afflicted with diabetes.

In some embodiments, the subject is afflicted with a disease characterized by increased risk for developing blood clots. In some embodiments, the subject is afflicted with diabetes. In some embodiments, the method comprises increasing the clot reaction time in a subject being afflicted with a disease characterized by increased risk for developing blood clots. In some embodiments, the method comprises increasing the clot reaction time in a subject being afflicted with diabetes.

As used herein, the term "risk" encompasses predisposition. In some embodiments, predisposition comprises genetic predisposition.

The term "subject" as used herein refers to an animal, more particularly to non-human mammals and human organism. Non-human animal subjects may also include prenatal forms of animals, such as, e.g., embryos or fetuses. Non-limiting examples of non-human animals include horse, cow, camel, goat, sheep, dog, cat, non-human primate, mouse, rat, rabbit, hamster, guinea pig, and pig. In one embodiment, the subject is a human. Human subjects may also include fetuses.

In some embodiments, increasing or increase comprises at least 5%, at least 15%, at least 25%, at least 40%, at least 50%, at least 75%, at least 100%, at least 250%, at least 350%, at least 500%, at least 750%, at least 850%, or at least 1,000% increase, or any value and range therebetween. Each possibility represents a separate embodiment of the invention. In some embodiments, increasing or increase comprises 5 to 1,000% increase.

In some embodiments, decreasing or decrease comprises at least 5%, at least 15%, at least 25%, at least 30%, at least 40%, at least 50%, at least 60%, at least 70%, at least 80%, at least 90%, at least 95%, at least 99%, or 100% decrease, or any value and range therebetween. Each possibility represents a separate embodiment of the invention. In some embodiments, decreasing or decrease comprises 5 to 100% decrease.

As used herein, the terms "treatment" or "treating" of a disease, disorder, or condition encompasses alleviation of at least one symptom thereof, a reduction in the severity thereof, or inhibition of the progression thereof. Treatment need not mean that the disease, disorder, or condition is totally cured. To be an effective treatment, a useful composition herein needs only to reduce the severity of a disease, disorder, or condition, reduce the severity of symptoms associated therewith, or provide improvement to a patient or subject's quality of life.

As used herein, the term "prevention" of a disease, disorder, or condition encompasses the delay, prevention, suppression, or inhibition of the onset of a disease, disorder, or condition. As used in accordance with the presently described subject matter, the term "prevention" relates to a process of prophylaxis in which a subject is exposed to the presently described peptides prior to the induction or onset of the disease/disorder process. This could be done where an individual has a genetic pedigree indicating a predisposition toward occurrence of the disease/disorder to be prevented. For example, this might be true of an individual whose ancestors show a predisposition toward certain types of, for example, conditions or disorders. The term "suppression" is used to describe a condition wherein the disease/disorder process has already begun but obvious symptoms of the condition have yet to be realized. Thus, the cells of an individual may have the disease/disorder, but no outside signs of the disease/disorder have yet been clinically recognized. In either case, the term prophylaxis can be applied to encompass both prevention and suppression. Conversely, the term "treatment" refers to the clinical application of active agents to combat an already existing condition whose clinical presentation has already been realized in a patient.

As used herein, the term "condition" includes anatomic and physiological deviations from the normal that constitute an impairment of the normal state of the living animal or one of its parts, that interrupts or modifies the performance of the bodily functions.

According to some embodiments, there is provided a method for preventing or treating a subject afflicted with a cell proliferation related disease or a condition associated therewith, comprising administering to the subject a therapeutically effective amount of a composition comprising a Tryptophol derivative, a 4-Ethyl-Phenol derivative, or a combination thereof.

According to some embodiments, there is provided a method for preventing or treating a subject afflicted with a heart disease or a condition associated therewith, comprising administering to the subject a therapeutically effective amount of a composition comprising a Tryptophol derivative, a 4-Ethyl-Phenol derivative, or a combination thereof.

In some embodiments, treating a cell proliferation related disease comprises reducing any one of: rate of cancerous cell proliferation, number of cancerous cells undergoing cell proliferation, number of cancerous cells, or any combination thereof, in the subject.

As used herein, the term "cell proliferation related disease" comprises any disease or disorder characterized by an increase of number or rate of cell proliferation. In some embodiments, a subject is characterized by comprising an increased number of proliferating cells. In some embodiments, the cell proliferation is an abnormal cell proliferation. In some embodiments, the cell proliferation is an unregulated, upregulated, dysregulated, or any combination thereof, cell proliferation.

In some embodiments, a cell proliferation related disease comprises or is cancer.

As used herein, "cancer" encompasses diseases associated with cell proliferation. Non-limiting types of cancer include, but are not limited to, carcinoma, sarcoma, lymphoma, leukemia, blastoma and germ cells tumors. In one embodiment, carcinoma refers to tumors derived from epithelial cells including, but not limited to breast cancer, prostate cancer melanoma, lung cancer, pancreas cancer, bile duct cancer, colorectal cancer, lung cancer, non-small cell lung carcinoma (NSCLC), skin cancer (melanoma) and colon cancer. In one embodiment, sarcoma refers of tumors derived from mesenchymal cells including but not limited to sarcoma botryoides, chondrosarcoma, Ewing's sarcoma, malignant hemangioendothelioma, malignant schwannoma, osteosarcoma, and soft tissue sarcomas. In one embodiment, lymphoma refers to tumors derived from hematopoietic cells that leave the bone marrow and tend to mature in the lymph nodes including but not limited to Hodgkin lymphoma, non-Hodgkin lymphoma, multiple myeloma and immunoproliferative diseases. In one embodiment, leukemia refers to tumors derived from hematopoietic cells that leave the bone marrow and tend to mature in the blood including but not limited to T-cell acute lymphoblastic leukemia, chronic lymphocytic leukemia, acute myelogenous leukemia, chronic myelogenous leukemia, hairy cell leukemia, T-cell prolymphocytic leukemia, large granular lymphocytic leukemia, and adult T-cell leukemia. In one embodiment, blastoma refers to tumors derived from immature precursor cells or embryonic tissue including but not limited to hepatoblastoma, medulloblastoma, nephroblastoma, neuroblastoma, pancreatoblastoma, pleuropulmonary blastoma, retinoblastoma and glioblastoma-multiforme.

In some embodiments, the subject is afflicted with a heart disease. In some embodiments, a heart disease comprises heart failure or myocardial infraction.

In some embodiments, a condition associated with a heart disease or myocardial infraction comprises myocardial scarring.

In some embodiments, treating comprises reducing myocardial fibrotic tissue volume, mass, or both, in the subject.

Tryptophol Derivative

In some embodiments, a Tryptophol derivative of the invention has the structure:

wherein "R1", "R2", "R3", and "R4" are selected from the group consisting of methyl (CH3), ethyl (CH3CH2), propyl (CH3CH2CH2) and butyl (CH3CH2CH2CH2); "n" is a carbon chain comprising: one, two, three or four carbons; and "m" is selected from the group consisting of: methyl (CH3), ethyl (CH3CH2), propyl (CH3CH2CH2) and butyl (CH3CH2CH2CH2).

In some embodiments, the Tryptophol derivative is Tryptophol acetate.

Tryptophol acetate is known in the art as having the structure:

4-Ethyl-Phenol Derivative

In some embodiments, a 4-Ethyl-Phenol derivative has the structure:

wherein each R is independently selected from the group consisting of: hydroxyl, hydrogen, methyl (CH3), ethyl (CH3CH2), propyl (CH3CH2CH2) and butyl (CH3CH2CH2CH2); "n", "m" are from 1 to 4, R1 comprises a heteroatom or is absent ----- represents a bond selected from the group consisting of: sp3 single C—C bond, sp2 double C—C bond, sp triple C—C bond; and X is selected from the group consisting of: a carboxylic acid derivative, an alkyl, and hydrogen.

In some embodiments, a 4-Ethyl-Phenol derivative has the structure:

wherein R, R1 and X are as described hereinabove.

In some embodiments, each R is independently selected from: hydroxyl, and hydrogen.

In some embodiments, R1 is selected from 0, NH, and NH2.

In some embodiments, 4-Ethyl-Phenol derivative is a dopamine derivative represented by formula:

or by formula:

wherein R and X are as described hereinabove.

In some embodiments, a dopamine derivative is represented by formula:

or by formula:

wherein R and X are as described hereinabove.

In some embodiments, X is hydrogen.

In some embodiments, 4-Ethyl-Phenol derivative is dopamine or a salt thereof.

In some embodiments, a 4-Ethyl-Phenol derivative has the structure:

wherein: each R is independently selected from: hydroxyl, and hydrogen; and X is selected from the group consisting of a carboxylic acid derivative, an alkyl, and hydrogen.

In some embodiments, X is wherein R2 is selected from: —OH, —SH, —NH2, thioalkyl, oxyalkyl, aminoalkyl, hydrogen, alkyl, substituted alkyl.

In some embodiments, R2 is hydrogen or an alkyl.

In some embodiments, R2 is a C1-C5 alkyl.

In some embodiments, R2 is hydrogen.

In some embodiments, the 4-Ethyl-Phenol is a derivative of Tyrosol acetate.

Tyrosol acetate is known in the art as having the structure:

In some embodiments, a 4-Ethyl-Phenol derivative is a derivative of caffeic acid having the structure:

wherein each R is independently selected from: hydroxyl, hydrogen, methyl (CH3), ethyl (CH3CH2), propyl (CH3CH2CH2) and butyl (CH3CH2CH2CH2); "n", "m" are from 1 to 4, ----- represents a bond selected from the group consisting of: sp3 single C—C bond, sp2 double C—C bond, sp triple C—C bond; and X is selected from: a carboxylic acid derivative, an alkyl, and hydrogen.

In some embodiments, each R is independently selected from: hydroxyl, and hydrogen.

In some embodiments, ----- represents an unsaturated C—C bond. In some embodiments, ----- represents a double C—C bond.

In some embodiments, X is selected from: a carboxylic acid derivative, and hydrogen.

In some embodiments, the derivative of caffeic acid has the structure:

wherein R and X are as defined hereinabove.

In some embodiments, the derivative of caffeic acid has the structure:

wherein R is as defined hereinabove, and R₃ is selected from: hydrogen, —OH, —SH, —NH₂, thioalkyl, oxyalkyl, aminoalkyl, hydrogen, alkyl, substituted alkyl.

In some embodiments, R is selected from: hydrogen, —OH, and alkyl.

In some embodiments, the derivative of caffeic acid has the structure:

wherein R3 is as defined hereinabove.

As used herein, the term "carboxylic acid derivative" encompasses carboxy, amide, carbonyl, anhydride, carbonate ester, and carbamate.

As used herein, the term "derivative" encompasses any compound having antimicrobial activity that is generated from a similar compound by a chemical reaction, or any compound produced from another compound by substitution of one or more atoms. In some embodiments, the derivative comprises a structural analog.

In some embodiments, a derivative as disclosed herein is obtained by any chemical modification of Tryptophol or 4-Ethyl-Phenol, as long as it has the ability to modulate abundance, diversity, or both, of a microbial population. In some embodiments, Tryptophol or 4-Ethyl-Phenol are chemically modified by adding at least one chemical group selected from: acetylation, methylation, phosphorylation, amidation or others. In some embodiments, a chemical modification comprises substitution. In some embodiments, the modification comprises the addition of an acetate group to Tryptophol or 4-Ethyl-Phenol. In some embodiments, a Tryptophol acetate or Tyrosol acetate further comprises at least one chemical group as described above.

As used herein, a Tryptophol derivative does not comprise Tryptophol.

As used herein, a 4-Ethyl-Phenol derivative does not comprise Tyrosol.

In some embodiments, the disclosed invention is directed to a composition comprising at least one molecule selected from: a Tryptophol derivative, a 4-Ethyl-Phenol derivative, and any combination thereof, and at least one pharmaceutically acceptable carrier or diluent, or a nutraceutically acceptable carrier or diluent.

In some embodiments, the composition comprises Tryptophol acetate, Tyrosol acetate, or any combination thereof, and at least one pharmaceutically acceptable carrier or diluent, or a nutraceutically acceptable carrier or diluent.

In some embodiments, the Tryptophol derivative and/or the 4-Ethyl-Phenol derivative is chemically synthesized or biosynthesized. Methods of biosynthesis are well known within the art, and can include, but are not limited to production in a cell culture or enzymatic cell-free production. In some embodiments, Tryptophol derivative and/or the 4-Ethyl-Phenol derivative is biosynthesized using a cell culture comprising *Kluyveromyces marxianus*. In some embodiments, a culture comprising *K. marxianus* is a mono- or polyculture. In some embodiments, the Tryptophol derivative and/or the 4-Ethyl-Phenol derivative is biosynthesized by *K. marxianus*. In some embodiments, the Tryptophol derivative and/or the 4-Ethyl-Phenol derivative are biosynthesized by *K. marxianus* according to the method of the present invention. In some embodiments, Tryptophol acetate or Tyrosol acetate are biosynthesized by *K. marxianus* according to the method of the present invention.

According to some embodiments, there is provided a composition comprising a Tryptophol derivative, a 4-Ethyl-Phenol derivative, or a combination thereof, and an acceptable carrier.

According to some embodiments, there is provided a composition comprising Tryptophol acetate and Tyrosol acetate, and a pharmaceutically or a nutraceutically acceptable carrier, for use in the modulation of blood coagulation in a subject in need thereof.

In some embodiments, the composition comprises any one of: a Tryptophol derivative, and a 4-Ethyl-Phenol derivative in a concentration ranging from 50 µM to 900 µM, 100 µM to 1,100 µM, 150 µM to 1,000 µM, 200 µM to 1,000 µM, 300 µM to 800 µM, 400 µM to 1,275 µM, 450 µM to 990 µM, or 375 µM to 1,575 µM. Each possibility represents a separate embodiment of the invention.

In some embodiments, a Tryptophol derivative and a 4-Ethyl-Phenol derivative are present in the herein disclosed composition in a weight per weight ratio (w/w) ranging from 10:1 (w/w) to 1:10 (w/w), 8:1 (w/w) to 1:8 (w/w), 6:1 (w/w) to 1:6 (w/w), 4:1 (w/w) to 1:4 (w/w), 3:1 (w/w) to 1:3 (w/w), 2:1 (w/w) to 1:2 (w/w), or is 1:1 (w/w).

In some embodiments, a Tryptophol derivative and a 4-Ethyl-Phenol derivative are present in the herein disclosed composition in a molar ratio ranging from 10:1 (m:m) to 1:10 (m:m), 8:1 (m:m) to 1:8 (m:m), 6:1 (m:m) to 1:6 (m:m), 4:1 (m:m) to 1:4 (m:m), 3:1 (m:m) to 1:3 (m:m), 2:1 (m:m) to 1:2 (m:m), or is 1:1 (m:m).

In some embodiments, a Tryptophol derivative and a 4-Ethyl-Phenol derivative are present in the herein disclosed composition in a molar ratio of 1:1 (m:m).

In some embodiments, the composition comprises a combined concentration of a Tryptophol derivative and a 4-Ethyl-Phenol derivative ranging from 150 µM to 900 µM, 200 µM to 1,800 µM, 250 µM to 1,500 µM, 200 µM to 1,900 µM, 300 µM to 2,000 µM, or 300 µM to 2,500 µM. Each possibility represents a separate embodiment of the invention.

In some embodiments, the composition comprises Tryptophol acetate.

In some embodiments, the composition comprises Tyrosol acetate, dopamine HCl, caffeic acid, or any combination thereof. In some embodiments, the composition comprises Tyrosol acetate.

In some embodiments, the composition comprises a combination of Tryptophol acetate and any one of: Tyrosol acetate, dopamine HCl, caffeic acid, or any combination thereof. In some embodiments, the composition comprises a combination of Tryptophol acetate and Tyrosol acetate.

In some embodiments, the composition further comprises a microorganism mixture.

In some embodiments, the microorganism mixture comprises *Kluyveromyces marxianus* and at least one probiotic microorganism. In some embodiments, the microorganism mixture comprises at least 3% *K. marxianus*.

In some embodiments, the at least one probiotic microorganism is a probiotic bacterium.

In some embodiments, the probiotic bacterium is selected form the group consisting of: *Lactobacillus, Propionibacterium, Lactococcus*, and *Leuconostoc*.

In some embodiments, the microorganism mixture is suspended in a medium.

In some embodiments, the medium is milk.

In some embodiments, the microorganism mixture is or comprises kefir.

In some embodiments, the Tryptophol derivative, the 4-Ethyl-Phenol derivative, or both, are produced by *K. marxianus*.

In one embodiment, *K. marxianus* is *K. marxianus* strain HA 63 [NRRL Y-8281, CBS 712].

As used herein, the term "probiotic" refers to any substance and/or a microorganism that promotes growth, especially of microorganisms with beneficial properties (e.g., intestinal flora).

In some embodiments, a microorganism content (%) within the microorganism mixture is quantified according to the portion of the microorganism's DNA out of the total DNA of the mixture. In some embodiments, DNA quantification is based directly on the amount of DNA extracted. In some embodiments, DNA quantification further comprises enzymatic reaction, including but not limited to restriction, ligation, amplification, sequencing, or any combination thereof. In some embodiments, DNA quantification is based on next generation sequencing. In some embodiments, DNA quantification is based on the ratio of the amount of microorganism-specific DNA reads compared to the total number of DNA reads of the microorganism mixture.

In some embodiments, a microorganism content within the microorganism mixture comprises the number of cells of the microorganism per volume of the microorganism mixture culture (e.g., colony forming unit [CFU]). In some embodiments, a microorganism content within the microorganism mixture comprises the number of cells of the microorganism compared to the total number of cells in the microorganism mixture. In some embodiments, a microorganism content within the microorganism mixture comprises the CFU of the microorganism.

In some embodiments, at least 1%, at least 3%, at least 5%, at least 7%, at least 10%, at least 15%, at least 20%, at least 30%, at least 35%, at least 40%, at least 45%, at least 50%, at least 55%, at least 60%, at least 65%, or at least 70% of cells in the microorganism mixture are *K. marxianus* cells, or any value and range therebetween. Each possibility represents a separate embodiment of the invention. In some embodiments, 1-4%, 2-5%, 4-7%, 6-11%, 10-16%, 15-22%, 20-32%, 30-35%, 32-40%, 38-48%, 45-55%, 50-60%, or 55-75%, 60-80%, 65-90%, or 80-100% of cells in the microorganism mixture are *K. marxianus* cells. Each possibility represents a separate embodiment of the invention.

In some embodiments, the composition comprises at least one probiotic bacterium. In one embodiment, a probiotic bacterium is selected from the genus *Lactobacillus*. In one embodiment, a probiotic bacterium is selected from the genus *Propionibacterium*. In one embodiment, a probiotic bacterium is selected from the genus. In one embodiment, a probiotic bacterium is selected from the genus *Lactococcus*. In one embodiment, a probiotic bacterium is selected from the genus *Leuconostoc*. In some embodiments, at least one probiotic bacterium comprises at least two, at least three, at least four, at least five, at least six, at least seven, at least eight, at least nine, or at least ten probiotic bacteria, or any value and range therebetween. Each possibility represents a separate embodiment of the invention. In some embodiments, 30% at most, 25% at most, 20% at most, 15% at most, 10% at most, 5% at most, or 1% at most, of cells in the microorganism mixture are probiotic bacteria, or any value and range therebetween. Each possibility represents a separate embodiment of the invention. In some embodiments, 1-5%, 4-10%, 8-18%, 12-20%, 17-25%, or 22-30% of cells in the microorganism mixture are probiotic bacteria. Each possibility represents a separate embodiment of the invention.

In some embodiments, the microorganism mixture further comprises other types of microorganisms. In one embodiment, the other microorganisms are not probiotic microorganisms, such as yeast or bacteria. In some embodiments, 15% at most, 13% at most, 11% at most, 10% at most, 9% at most, 7% at most, 5% at most, 4% at most, 3% at most, 2% at most, or 1% at most of cells in the microorganism mixture belong to a microorganism type other than a probiotic yeast and at least one probiotic bacteria, or any value and range therebetween. Each possibility represents a separate embodiment of the invention. In some embodiments, the microorganism mixture comprises no other type of microorganism except probiotic yeast and at least one probiotic bacteria.

In some embodiments, the microorganism mixture is suspended in a medium. In some embodiments, the microorganism mixture is grown in the medium. In some embodiments, the medium is a cell culture medium suitable for growth and maintenance of the microorganism mixture. In one embodiment, the cell culture medium is optimized for microorganism growth, such as, but not limited to, milk.

As used herein, "cell culture medium" refers to any medium, liquid, semi solid, or solid, which enables cells proliferation. Cell culture media are known in the art and can be selected, depending on the type of cell to be grown. For example, a cell culture medium for use in growing cells is Luria-Bertani broth (LB; Miller's broth). In some embodiments, microorganism mixture is cultured under effective conditions, which allow for increased yield of production from the culture microorganism mixture. Non-limiting example for increased yield include, but not limited to, increased gene expression, protein production and secretion, molecule biosynthesis, proliferation, and others. In some embodiments, effective culture conditions include, but are not limited to, effective media, bioreactor, temperature, pH, and oxygen conditions that permit for increased production yield. In one embodiment, an effective medium refers to any medium in which a microorganism mixture is cultured to produce a compound of the present invention. In some embodiments, a cell culture medium typically includes an aqueous solution having assimilable carbon, nitrogen and phosphate sources, and appropriate salts, minerals, metals, and other nutrients, such as vitamins. In some embodiments, microorganism mixture can be cultured in conventional fermentation bioreactors, shake flasks, test tubes, microtiter dishes and petri plates. In some embodiments, culturing is carried out at a temperature, pH, and oxygen content appropriate for a probiotic microorganism, such as a yeast or bacteria. In some embodiments, culturing conditions are within the expertise of one of ordinary skill in the art. A non-limiting example for a process of culturing a microorganism mixture of the present invention comprises culturing the microorganism mixture in milk at 28° C. for about 24 hours.

In one embodiment, the process of culturing comprises culturing the microorganism mixture for a period of 12-16 hours, 14-18 hours, 12-24 hours, 16-24 hours, 18-28 hours, 10-20 hours, 22-36 hours. Each possibility represents a separate embodiment of the invention.

In one embodiment, the process of culturing comprises culturing the microorganism mixture at a temperature of 20-26° C., 24-28° C., 22-34° C., 26-34° C., 28-38° C., 20-30° C., 32-46° C. Each possibility represents a separate embodiment of the invention.

In some embodiments, the microorganism mixture is cultured in milk. In some embodiments, the microorganism mixture cultured in milk yields a fermented milk product. In some embodiments, the fermented milk product is selected from: yogurt, probiotic yogurt, or kefir.

In some embodiments, the fermented milk product comprises a microorganism mixture, Tryptophol derivative, 4-Ethyl-Phenol derivative, or any combination thereof.

In some embodiments, the composition further comprises an acceptable carrier. In some embodiments, the carrier is a pharmaceutical carrier. In some embodiments, the carrier is a nutraceutical carrier.

In some embodiments, the composition is a pharmaceutical composition. In some embodiments, the composition is a nutraceutical composition.

As used herein, the term "carrier" refers to a diluent, adjuvant, excipient, or vehicle with which the active compound is administered. Such carriers can be sterile liquids, such as water-based and oils, including those of petroleum, animal, vegetable, or synthetic origin, such as peanut oil, soybean oil, mineral oil, sesame oil and the like, polyethylene glycols, glycerin, propylene glycol or other synthetic solvents.

Water may be used as a carrier such as when the active compound is comprised by a pharmaceutical composition being administered intravenously. Saline solutions and aqueous dextrose and glycerol solutions can also be employed as liquid carriers, particularly for injectable solutions. Suitable pharmaceutical excipients include starch, glucose, lactose, sucrose, gelatin, malt, rice, flour, chalk, silica gel, sodium stearate, glycerol monostearate, talc, sodium chloride, dried skim milk, glycerol, propylene glycol, water, ethanol, and the like. The composition, if desired, can also contain minor amounts of wetting or emulsifying agents, or pH buffering agents such as acetates, citrates, or phosphates. Antibacterial agents such as benzyl alcohol or methyl parabens; antioxidants such as ascorbic acid or sodium bisulfite; and agents for the adjustment of tonicity such as sodium chloride or dextrose are also envisioned. The carrier may comprise, in total, from about 0.1% to about 99.99999% by weight of the compositions presented herein.

An embodiment of the invention relates to molecules of the present invention or derivative thereof, presented in unit dosage form and prepared by any of the methods well known in the art of pharmacy. In one embodiment, the unit dosage form is in the form of a tablet, capsule, lozenge, wafer, patch, ampoule, vial, or pre-filled syringe.

In addition, in vitro assays may optionally be employed to help identify optimal dosage ranges. The precise dose to be employed in the formulation will also depend on the route of administration, and the nature of the disease or disorder, and should be decided according to the judgment of the practitioner and each patient's circumstances. Effective doses can be extrapolated from dose-response curves derived from in-vitro or in-vivo animal model test bioassays or systems.

In one embodiment, the composition of the present invention is administered in the form of a composition, e.g., pharmaceutical or nutraceutical, comprising at least one of the active components of this invention (e.g., Tryptophol derivative, or 4-Ethyl Phenol derivative) together with an acceptable carrier or diluent. In another embodiment, the composition of the invention can be administered either individually or together in any conventional oral, parenteral, or transdermal dosage form.

As used herein, the terms "administering", "administration", and like terms refer to any method which, in sound medical practice, delivers a composition containing an active agent to a subject in such a manner as to provide a therapeutic effect.

In some embodiments, the composition comprising the compound(s) disclosed herein, or any derivative or combination thereof, or the microorganism mixture disclosed herein, is administered via oral (i.e., enteral), rectal, vaginal, topical, nasal, ophthalmic, transdermal, subcutaneous, intramuscular, intraperitoneal, or intravenous routes of administration. The route of administration of the composition will depend on the disease or condition to be treated. Suitable routes of administration include, but are not limited to, parenteral injections, e.g., intradermal, intravenous, intramuscular, intralesional, subcutaneous, intrathecal, and any other mode of injection as known in the art. In addition, it may be desirable to introduce the composition disclosed herein by any suitable route, including intraventricular and intrathecal injection; intraventricular injection may be facilitated by an intraventricular catheter, for example, attached to a reservoir. Pulmonary administration can also be employed, e.g., by use of an inhaler or nebulizer.

For topical application, the compound(s) disclosed herein, or any derivative or combination thereof, or the microorganism mixture disclosed herein, can be combined with a pharmaceutically acceptable carrier so that an effective dosage is delivered, based on the desired activity. The carrier can be in the form of, for example, and not by way of limitation, an ointment, cream, gel, paste, foam, aerosol, suppository, pad, or gelled stick.

For oral applications, the composition may be in the form of tablets or capsules, which can contain any of the following ingredients, or compounds of a similar nature: a binder such as microcrystalline cellulose, gum tragacanth or gelatin; an excipient such as starch or lactose; a disintegrating agent such as alginic acid, Primogel, or corn starch; a lubricant such as magnesium stearate; or a glidant such as colloidal silicon dioxide. When the dosage unit form is a capsule, it can contain, in addition to materials of the above type, a liquid carrier such as fatty oil. In addition, dosage unit forms can contain various other materials which modify the physical form of the dosage unit, for example, coatings of sugar, shellac, or other enteric agents. The tablets of the invention can further be film coated. In some embodiments, oral application of the pharmaceutical composition may be in the form of drinkable liquid. In some embodiments, oral application of the pharmaceutical composition may be in the form of an edible product. Non-limiting examples for oral carriers include, but are not limited to milk, yogurt, probiotic yogurt, kefir, fermented milk, or others.

For purposes of parenteral administration, solutions in sesame or peanut oil or in aqueous propylene glycol can be employed, as well as sterile aqueous solutions of the corresponding water-soluble salts. Such aqueous solutions may be suitably buffered, if necessary, and the liquid diluent first rendered isotonic with sufficient saline or glucose. These aqueous solutions are especially suitable for intravenous, intramuscular, subcutaneous, and intraperitoneal injection purposes.

The compositions also include incorporation of the active material into or onto particulate preparations of polymeric compounds such as polylactic acid, polglycolic acid, hydrogels, etc., or onto liposomes, microemulsions, micelles, unilamellar or multilamellar vesicles, erythrocyte ghosts, or spheroplasts. Such compositions will influence the physical state, solubility, stability, rate of in vivo release, and rate of in vivo clearance.

In one embodiment, the present invention provides combined preparations. In one embodiment, "a combined preparation" defines especially a "kit of parts" in the sense that the combination partners as defined above can be dosed independently or by use of different fixed combinations with distinguished amounts of the combination partners i.e., simultaneously, concurrently, separately, or sequentially. In some embodiments, the parts of the kit of parts can then, e.g., be administered simultaneously or chronologically staggered, that is at different time points and with equal or different time intervals for any part of the kit of parts. The ratio of the total amounts of the combination partners, in some embodiments, can be administered in the combined preparation. In one embodiment, the combined preparation can be varied, e.g., in order to cope with the needs of a patient subpopulation to be treated or the needs of the single patient which different needs can be due to a particular disease, severity of a disease, age, sex, or body weight as can be readily made by a person skilled in the art.

In one embodiment, it will be appreciated that the molecules disclosed herein, or any derivative or combination thereof, or the microorganism mixture disclosed herein, can be provided to the individual with additional active agents to achieve an improved therapeutic effect as compared to treatment with each agent by itself. In another embodiment, measures (e.g., dosing and selection of the complementary agent) are taken to adverse side effects which are associated with combination therapies.

In one embodiment, depending on the severity and responsiveness of the condition to be treated, dosing can be of a single or a plurality of administrations, with course of treatment lasting from several days to several weeks or until cure is affected or diminution of the disease state is achieved.

In some embodiments, the composition disclosed herein is administered in a therapeutically safe and effective amount. As used herein, the term "safe and effective amount" refers to the quantity of a component which is sufficient to yield a desired therapeutic response without undue adverse side effects (such as toxicity, irritation, or allergic response) commensurate with a reasonable benefit/risk ratio when used in the presently described manner. In another embodiment, a therapeutically effective amount of the molecules, or any derivative or combination thereof, is the amount of the mentioned herein molecules necessary for the in vivo measurable expected biological effect. The actual amount administered, and the rate and time-course of administration, will depend on the nature and severity of the condition being treated. Prescription of treatment, e.g., decisions on dosage, timing, etc., is within the responsibility of general practitioners or specialists, and typically takes account of the disorder to be treated, the condition of the individual patient, the site of delivery, the method of administration and other factors known to practitioners. Examples of techniques and protocols can be found in Remington: The Science and Practice of Pharmacy, 21st Ed., Lippincott Williams & Wilkins, Philadelphia, Pa., (2005). In some embodiments, preparation of effective amount or dose can be estimated initially from in vitro assays. In one embodiment, a dose can be formulated in animal models and such information can be used to more accurately determine useful doses in humans.

In one embodiment, toxicity and therapeutic efficacy of the active ingredients described herein can be determined by standard pharmaceutical procedures in vitro, in cell cultures or experimental animals. In one embodiment, the data obtained from these in vitro and cell culture assays and animal studies can be used in formulating a range of dosage for use in human. In one embodiment, the dosages vary depending upon the dosage form employed and the route of administration utilized. In one embodiment, the exact formulation, route of administration and dosage can be chosen by the individual physician in view of the patient's condition. [See e.g., Fingl, et al., (1975) "The Pharmacological Basis of Therapeutics", Ch. 1 p. 1].

Pharmaceutical compositions containing the molecules disclosed herein, or any derivative or combination thereof, or the microorganism mixture disclosed herein, as the active ingredient can be prepared according to conventional pharmaceutical compounding techniques. See, for example, Remington's Pharmaceutical Sciences, 18th Ed., Mack Publishing Co., Easton, Pa. (1990). See also, Remington: The Science and Practice of Pharmacy, 21st Ed., Lippincott Williams & Wilkins, Philadelphia, Pa. (2005).

In one embodiment, compositions including the preparation of the present invention formulated in a compatible pharmaceutical carrier are prepared, placed in an appropriate container, and labeled for treatment of an indicated condition.

In one embodiment, compositions of the present invention are presented in a pack or dispenser device, such as an FDA approved kit, which contains, one, or more unit dosages forms containing the active ingredient. In one embodiment, the pack, for example, comprises metal or plastic foil, such as a blister pack. In one embodiment, the pack or dispenser device is accompanied by instructions for administration. In one embodiment, the pack or dispenser is accommodated by a notice associated with the container in a form prescribed by a governmental agency regulating the manufacture, use or sale of pharmaceuticals, which notice is reflective of approval by the agency of the form of the compositions or human or veterinary administration. Such notice, in one embodiment, is labeling approved by the U.S. Food and Drug Administration for prescription drugs or of an approved product insert.

In some embodiments, the composition is suitable for use in the prevention or treatment of a subject afflicted with cell proliferation disease.

In some embodiments, the composition is suitable for use in the prevention or treatment of a subject afflicted with a heart disease or a condition associated therewith.

General

As used herein the term "about" refers to ±10%.

The terms "comprises", "comprising", "includes", "including", "having" and their conjugates mean "including but not limited to".

The term "consisting of" means "including and limited to". The term "consisting essentially of" means that the composition, method, or structure may include additional ingredients, steps and/or parts, but only if the additional ingredients, steps and/or parts do not materially alter the basic and novel characteristics of the claimed composition, method, or structure. As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical, and medical arts. As used herein, the term "treating" includes abrogating, substantially inhibiting, slowing, or reversing the progression of a condition, substantially ameliorating clinical or aesthetical symptoms of a condition, or substantially preventing the appearance of clinical or aesthetical symptoms of a condition.

Additional objects, advantages, and novel features of the present invention will become apparent to one ordinarily skilled in the art upon examination of the following examples, which are not intended to be limiting. Additionally, each of the various embodiments and aspects of the present invention as delineated hereinabove and as claimed in the claims section below finds experimental support in the following examples.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments unless the embodiment is inoperative without those elements.

EXAMPLES

Reference is now made to the following examples, which together with the above descriptions illustrate some embodiments of the invention in a non-limiting fashion.

Generally, the nomenclature used herein, and the laboratory procedures utilized in the present invention include molecular, biochemical, microbiological, and recombinant DNA techniques. Such techniques are thoroughly explained in the literature. See, for example, "Molecular Cloning: A laboratory Manual" Sambrook et al., (1989); "Current Protocols in Molecular Biology" Volumes I-III Ausubel, R. M., ed. (1994); Ausubel et al., "Current Protocols in Molecular Biology", John Wiley and Sons, Baltimore, Maryland (1989); Perbal, "A Practical Guide to Molecular Cloning", John Wiley & Sons, New York (1988); Watson et al., "Recombinant DNA", Scientific American Books, New York; Birren et al. (eds.) "Genome Analysis: A Laboratory Manual Series", Vols. 1-4, Cold Spring Harbor Laboratory Press, New York (1998); methodologies as set forth in U.S. Pat. Nos. 4,666,828; 4,683,202; 4,801,531; 5,192,659 and 5,272,057; "Cell Biology: A Laboratory Handbook", Volumes I-III Cellis, J. E., ed. (1994); "Culture of Animal Cells—A Manual of Basic Technique" by Freshney, Wiley-Liss, N. Y. (1994), Third Edition; "Current Protocols in Immunology" Volumes I-III Coligan J. E., ed. (1994); Stites et al. (eds), "Basic and Clinical Immunology" (8th Edition), Appleton & Lange, Norwalk, CT (1994); Mishell and Shiigi (eds), "Strategies for Protein Purification and Characterization—A Laboratory Course Manual" CSHL Press (1996); all of which are incorporated by reference. Other general references are provided throughout this document.

Materials and Methods

Assessing the Effect of Molecules on Whole Blood Clotting by Thromboelastography Analysis Clotting of whole blood (from healthy volunteers, and diabetics patients) was monitored by thromboelastography (TEG) on a TEGs 5000 Hemostasis Analyzer (Haemoscope Inc., Niles, IL) equipped with two independent channels. Thermoelastograms were recorded at 37° C. and analyzed using the TEGs Analytical Software) version 4.2.3 provided with the instrument). Reported clotting parameters are the time until the onset in the measured strength considered as clot reaction time, R; the time until achieving 20% of the maximum clot strength (clotting time), k; the rate of clot strength increase measuring the kinetics of clot formation, the α angle; and finally, the maximum clot strength, MA.

Aqueous solutions of molecules mixture in a ratio of 1:1 in deionized water were prepared in the concentration range of 400-1,800 µM. TEG cups were first filled with 20 mL of 250 mM $CaCl_2$, supplemented with 227 mL of human blood sample, followed by the addition of the appropriate volume of the molecule's mixture dissolved in water to obtain the above rang of concentration or TBS as control before initiating the test. The test completed when clotting parameters obtained final values or within 45 min. Each sample was run in duplicates, n≥5 individual blood samples. TEG values of control fell within the acceptable range reported for human whole blood barring an expected decrease in clot strength (MA), as tested blood was deficient in platelets (Scarpelini et al. Biol. Res., 2009).

Effect of the Molecules on the Assembly of Fibrin Peptide

Peptide Preparations

Fibrinogen was prepared in Buffer 1 (150 mM NaCl, 2.5 mM $CaCl_2$, and 10 mM Hepes, at pH 7.4), divided in several aliquots, and stored frozen at −80° C. until analysis, with a final concentration of 0.9 mg/mL in the reaction mixture.

Human a-thrombin was obtained from Mercury (Israel) and was diluted in 0.05 M Tris-HCl, 0.1 M NaCl, pH 7.5, to a concentration of 291 U/mL, divided in aliquots, and stored at −80° C. Before use, thrombin was diluted to reach the required concentration using Buffer 2 (0.13 M NaCl and 10 mM Hepes, pH 7.4).

Fibrin Polymerization by Turbidity

In a 96-well plate, 90 μL fibrinogen in Buffer 1 (150 mM NaCl, 2.5 mM CaCl$_2$, and 10 mM Hepes, at pH 7.4) was mixed with 10 μL thrombin in Buffer 2 (0.13 M NaCl and 10 mM Hepes, pH 7.4) to achieve final concentrations of 0.9 mg/mL fibrinogen and 0.1 U/mL thrombin in absence and presence of study molecules in water solution in concentration of 50, 150 and 300 μM. Calcium chloride had a final concentration of 2.25 mM in the reaction mixture. Fibrin polymerization was monitored using a BioTek Synergy H1 plate reader (BioTek, Winooski, VT, USA), at a wavelength of 340 nm at t=0 and 4 min at 37° C. using a temperature-controlled program.

Atomic Force Microscopy (AFM)

Peptide samples (0.9 mg/mL fibrinogen+0.1 U Thrombin in absence and presence of 300 μM molecules mixture) were deposited on a silicon wafer and scanned 15 min after mixing by AFM under wet conditions (Cypher ES, Asylum Research, an Oxford Instruments company, Goleta, CA), in tapping mode. All images were acquired using a silicon probe (AC 40, Olympus) under the following conditions: spring constant 2 N/ml, frequency 25 kHz, and a tip with radius 9 nm.

Example 1

A Combination of Tyrosol Acetate and Tryptophol Acetate Accelerates Blood Clotting The inventors have studied the effect of tryptophol acetate and tyrosol acetate on human normal whole blood coagulation. The blood clotting was monitored by thromboelastography (TEG). TEG is one of the most common whole-blood viscoelastic coagulation tests used in clinical laboratories and at the point of care. TEG provides a direct information of the blood clotting kinetic and strength, with no 'added reagents. Clotting of human normal whole blood was monitored by TEG on a TEG 5000 Hemostasis Analyzer (Haemoscope Inc., Niles, IL) equipped with two independent channels. Thermoelastograms were recorded at 37° C. and analyzed using the TEG Analytical Software (version 4.2.3 provided using the instrument). Reported clotting parameters are the time till onset in the measured strength considered as the clot reaction time, R; the time till achieving 20% of the maximum clot strength (clotting time), k; the rate of the clot strength increase measuring the kinetics of clot formation, the α angle; and lastly, the maximum clot strength, MA (see table 1).

TABLE 1

Healthy blood clotting parameters (TEG analysis)

| | Control | +Molecules |
|---|---|---|
| R | 5.5 min | 4.5 min |
| K | 1.3 min | 1.4 min |
| Angel | 73.3 deg | 74.2 deg |
| MA | 59.1 mm | 56.8 mm |

TEG cups were first filled with 250 μl of human normal whole blood followed by the addition of 250 μl of tryptophol acetate and tyrosol acetate solution each in a concentration of 300 μM or DMSO (solvent) as control before initiating the test.

Figure 1A:
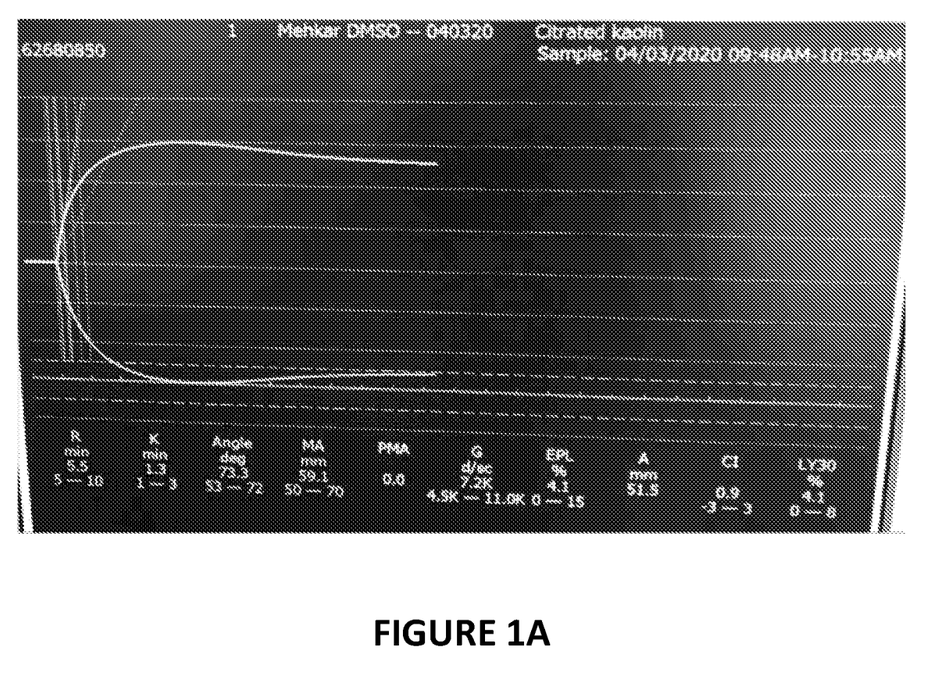
FIGS. 1A-1B include graphs showing thromboelastography (TEG) curves of a control sample (1A) or a human normal whole blood sample supplemented with a combination of tryptophol acetate and tyrosol acetate (1B).
Figure 1B:
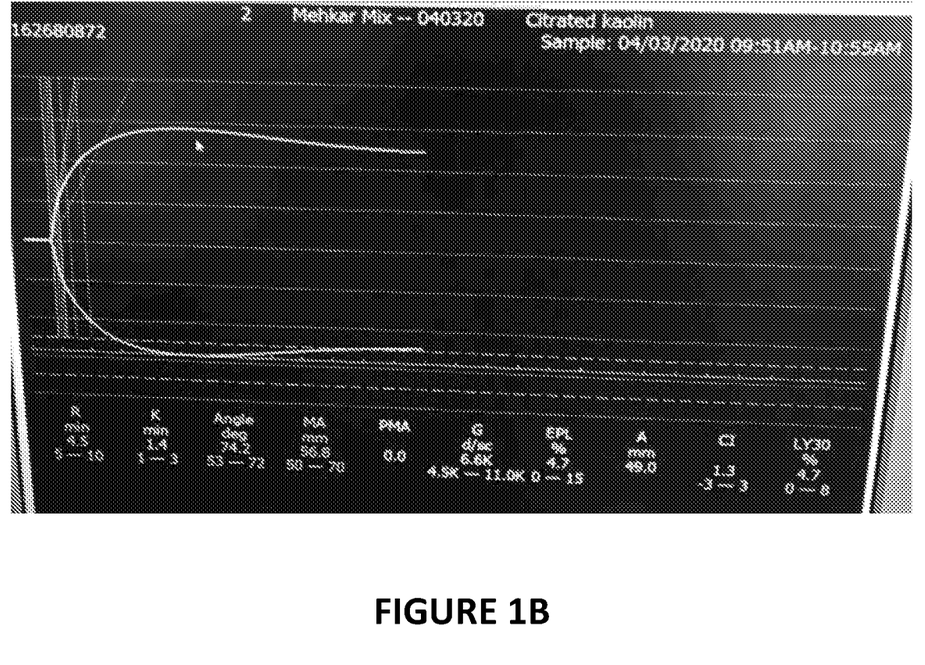
Figure 4:
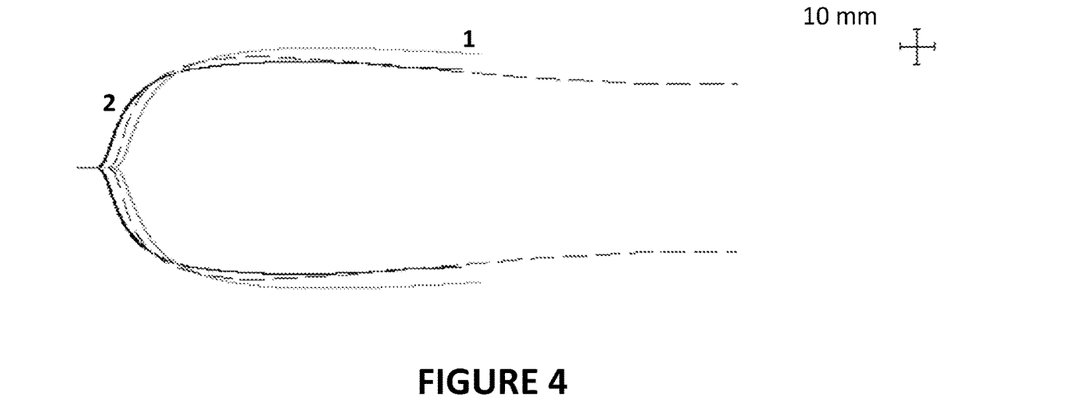
FIG. 4 includes TEG curves showing the effects of the studied molecules (Tryptophol acetate and Tyrosol acetate) on human normal blood clotting by TEG assays. Representative TEG curves of TBS-control (1), molecules' mixture at a concentration of 200 μM of each compound (2) and normal tracing (dashed line). Further parameters are provided in Table 2.

A combination of tryptophol acetate and tyrosol acetate significantly reduced the clot reaction time by 1 minute, compared with control (FIG. 1). To this end, the K, Angle and MA clotting parameters showed no significant difference compared to Control (Table 1). These results indicate the feasibility of accelerating blood clotting in cases where rapid blood clotting is required as in massive bleeding. This result was further validated in a following experiment showing the same trend of clot reaction reduction, but to a greater extent (FIG. 4, and Table 2).

TABLE 2

Healthy blood clotting parameters (TEG analysis)

| | R (min) | K (min) | α (degree) | MA (mm) |
|---|---|---|---|---|
| Control | 6 ± 0.6 | 2.1 ± 0.5 | 60.9 ± 4.9 | 61 ± 3.2 |
| 203&180; 200 μM each | 4.2 ± 0.1 | 2.3 ± 0.7 | 60.8 ± 5.4 | 56.4 ± 0.4 |
| 203; 200 μM | 6.2 ± 0.2 | 2.3 ± 0.1 | 56.8 ± 2.7 | 60.5 ± 1.5 |
| 180; 200 μM | 6.4 | 1.8 | 59.6 | 59.0 |
| Serotonin; 200 μM | 6.8 ± 0.9 | 2.4 ± 0.2 | 58.2 ± 0.3 | 60 ± 0.4 |
| Tolerance interval (normal range) | 3.8-9.8 | 0.7-3.4 | 47.8-77.7 | 49.7-72.7 |

R = time to initial fibrin formation;
K = time to clot formation;
α = alpha angle, rate of clot formation;
MA = maximum amplitude, representing the clot's full strength
203—Tryptophol acetate;
180—Tyrosol acetate.

Therefore, it is suggested to treat a "normal" or a "healthy" subject in need of induction or enhancement of blood coagulation, e.g., hemorrhaging and/or trauma, with a combination or a mixture of a Tryptophol derivative (e.g., Tryptophol acetate) and a 4-Ethyl-Phenol derivative (e.g., Tyrosol acetate).

Example 2

The Effect of Tyrosol Acetate and Tryptophol Acetate on Whole Blood Clotting

Figure 2A:
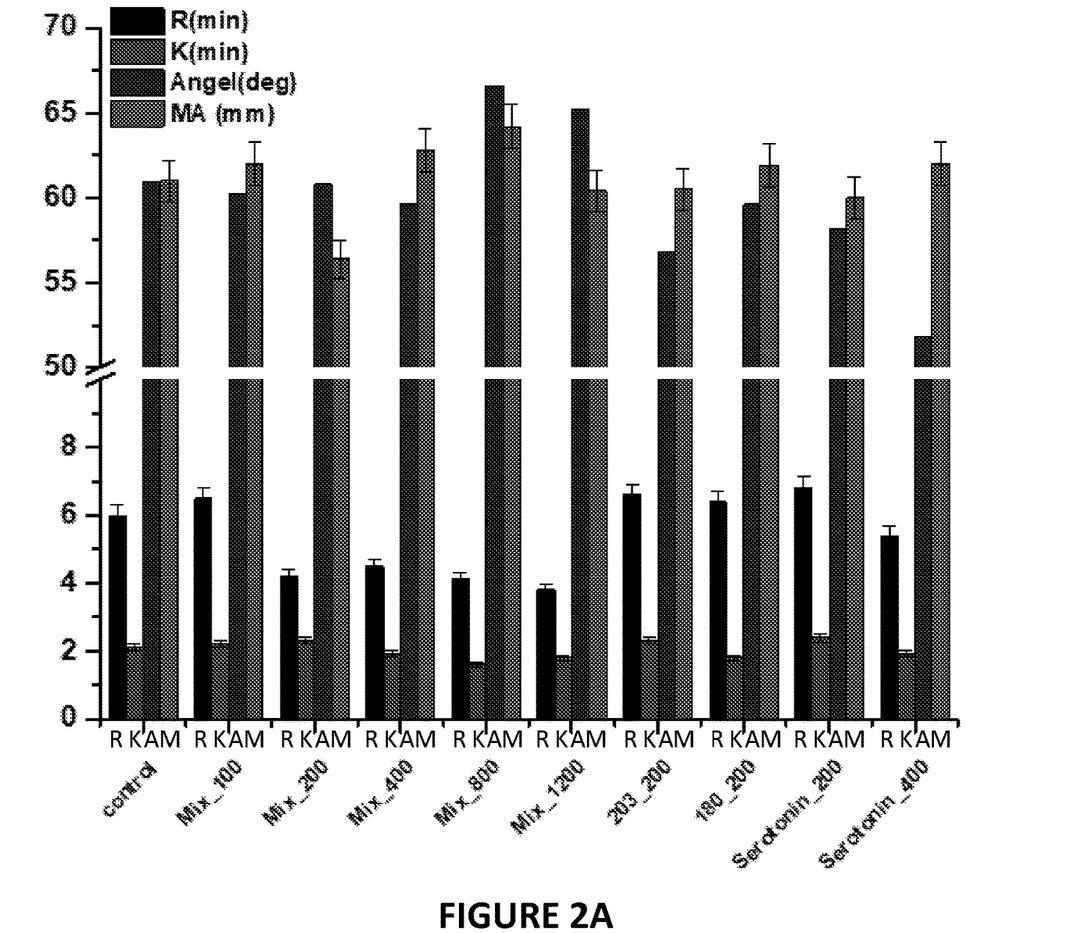
FIGS. 2A-2B include a vertical bar graph and TEG curves. (2A) A vertical bar graph showing the effects of study molecules tryptophol acetate and tyrosol acetate (203, and 180, respectively) and serotonin on normal human blood clotting by TEG assays. Clotting parameters R, K, α (A), and MA (M), are expressed as the mean±standard error of the mean of normal whole blood samples with the titration of molecules mixture and each molecule individually. TBS was added as the control sample and serotonin used as tryptophol acetate derivative. (2B) Representative TEG curves of whole blood sampled from diabetic patients and supplemented with molecules mixture at concentrations of 400 μM (1) and 1,200 μM (3), or control TBS (2). Reported clotting parameters are: R=time to initial fibrin formation; K=time to clot formation; α=alpha angle, rate of clot formation; MA=maximum amplitude, representing the clot's full strength. LY30=lysis percentage of fibrinolysis of thrombocytes after 30 min from clot formation. Dashed line represents a normal whole blood sample analysis.
Figure 5:
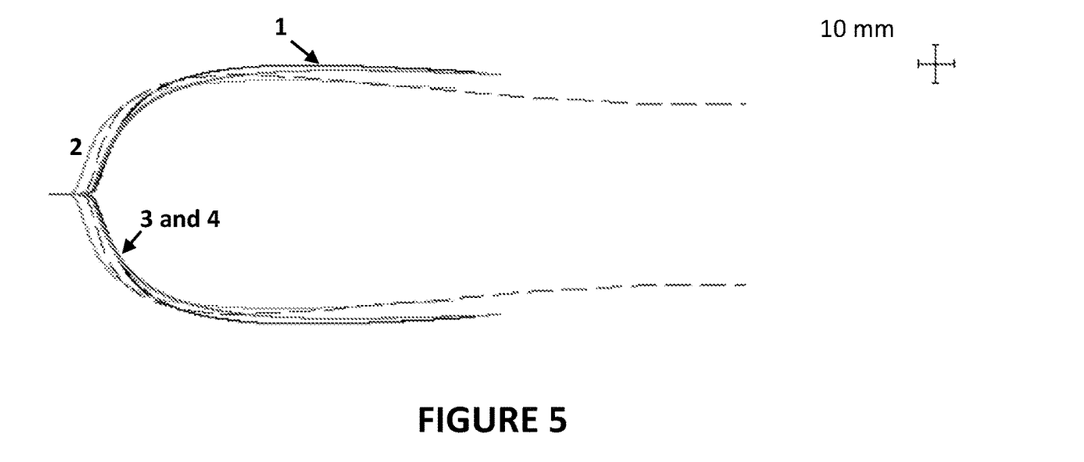
FIG. 5 includes TEG curves showing a synergistic effect of the mixture of the studied molecules (Tryptophol acetate and Tyrosol acetate) on human normal blood clotting by TEG assays. Representative TEG curves of TBS-control (1), molecules' mixture at a concentration of 200 μM of each compound (2), 200 μM of Tyrosol acetate ('alone'; 3), 200 μM of Tryptophol acetate ('alone'; 4), and normal tracing (dashed line). Further parameters are provided in Table 3.

The inventors have examined the effect of Tyrosol acetate and Tryptophol acetate on blood coagulation. The clotting was not affected in whole blood samples supplemented with a molecule's concentration of 100 μM each, compared to controls of whole blood samples supplemented with an equivalent volume of TBS. When the concentration of molecules was increased to 200 μM, the inventors have observed a significant shortening of the clot reaction time, R, compared to the control (FIGS. 2A and 5, and Table 3). Increasing the molecules concentration to 800 or 1,200 μM influenced the whole blood clotting parameters, as follows: (1) a shorter clotting time, k; (2) a shorter clot reaction time, R; (3) a faster kinetics of clot formation, the α angle; and (4) no significant effect on clot maximum strength, MA, compared to the control (FIGS. 2A and 5, and Table 3). Importantly, the observation effect on the TEG parameters in the treatment with the mixture of molecules at a concentration of 200 μM each, was not observed when the treatment was performed using each molecule individually at a similar concentration. In addition, the use of serotonin, a derivative of tryptophol acetate, did not show a similar effect.

TABLE 3

Healthy blood clotting parameters (TEG analysis)

|  | R (min) | K (min) | α (degree) | MA (mm) |
|---|---|---|---|---|
| Control | 6 ± 0.6 | 2.1 ± 0.5 | 60.9 ± 4.9 | 61 ± 3.2 |
| 203&180; 100 μM each | 6.5 ± 0.4 | 2.2 ± 0.1 | 60.2 ± 1.5 | 62 ± 0.6 |
| 203&180; 200 μM each | 4.2 ± 0.1 | 2.3 ± 0.7 | 60.8 ± 5.4 | 56.4 ± 0.4 |
| 203&180; 400 μM each | 4.5 ± 0.6 | 1.9 ± 0.4 | 59.7 ± 6.8 | 62.8 ± 4.6 |
| 203&180; 800 μM each | 4.1 ± 0.2 | 1.6 ± 0.5 | 66.6 ± 5.3 | 64.2 ± 3.2 |
| 203&180; 1,200 μM each | 4 ± 0.1 | 1.6 ± 0.1 | 66.9 ± 2.8 | 62.3 ± 0.3 |
| 203; 200 μM | 6.2 ± 0.2 | 2.3 ± 0.1 | 56.8 ± 2.7 | 60.5 ± 1.5 |
| 180; 200 μM each | 6.4 | 1.8 | 59.6 | 59.0 |
| Serotonin 200 μM | 6.8 ± 0.9 | 2.4 ± 0.2 | 58.2 ± 0.3 | 60 ± 0.4 |
| Serotonin 400 μM | 5.2 + 0.4 | 1.5 ± 0.2 | 62.4 ± 0.9 | 61.3 ± 1.7 |
| Tolerance interval (normal range) | 3.8-9.8 | 0.7-3.4 | 47.8-77.7 | 49.7-72.7 |

Figure 2B:
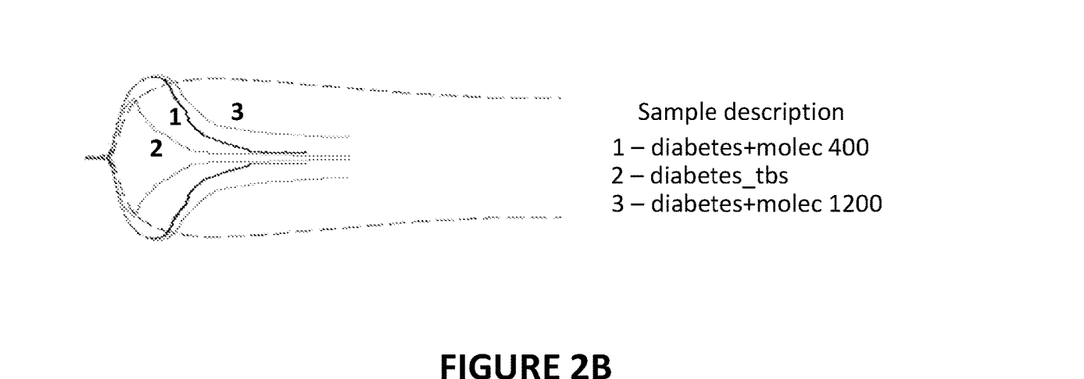

To check whether supplementation the molecules would be effective in improving clotting parameters in blood samples of patients afflicted with a disease characterized by increased predisposition to excessive blood clotting, the inventors examined the coagulating effect of the current molecules on whole blood samples derived from diabetic patients. The results showed that in the presence of the molecules, in both of the examined concentrations, there was a positive effect of repairing the disease damage in the context of coagulation processes, such that coagulation parameters were reduced and resembled healthy or non-diabetic coagulation profile. Moreover, the effect was increased in a dose dependent manner (FIG. 2B).

Therefore, it is suggested to treat a subject in need of reduction or inhibition of blood coagulation, e.g., having increased tendency to produce blood clots, such as in the case of diabetes, with a combination or a mixture of a Tryptophol derivative (e.g., Tryptophol acetate) and a 4-Ethyl-Phenol derivative (e.g., Tyrosol acetate).

Figure 3A:
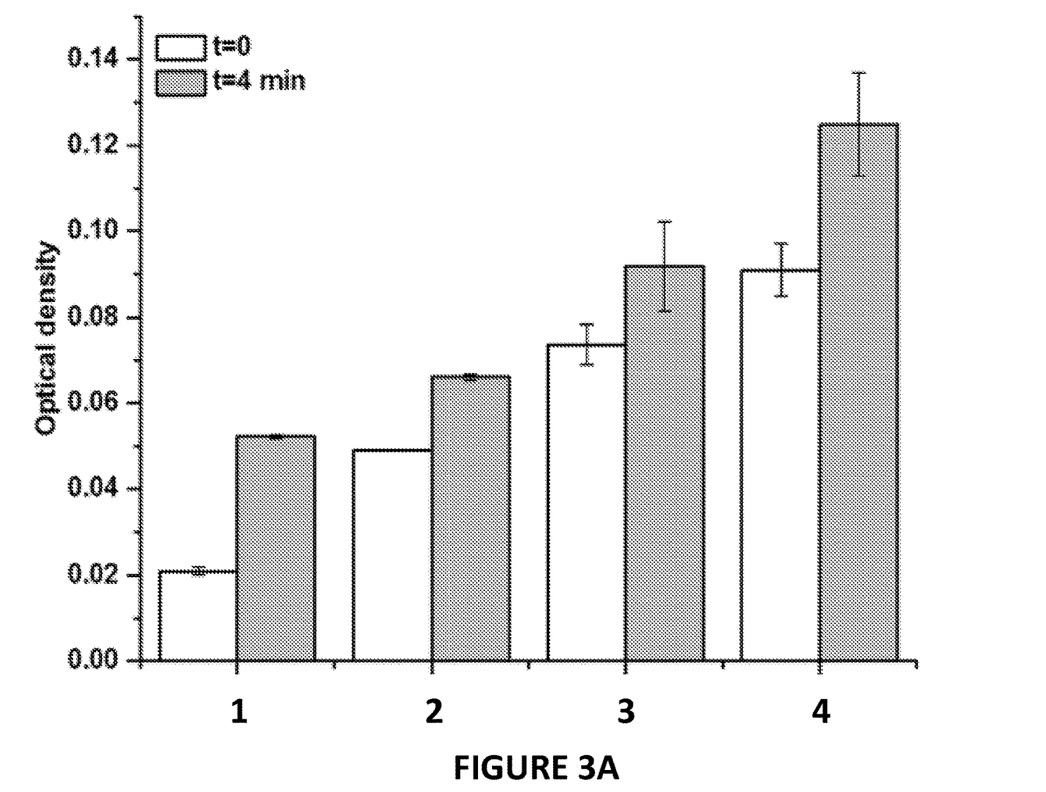
FIG. 3A-3C include a vertical bar graph and micrographs showing the effect of the molecules on the assembly of fibrin peptide. (3A) Turbidity assay at time zero (t=0) or after 4 minutes (t=4) of the following treatments: (1) 0.9 mg/ml Fibrinogen+0.1 U Thrombin; (2) 0.9 mg/ml Fibrinogen+0.1 U Thrombin+50 μM molecules' mixture; (3) 0.9 mg/ml Fibrinogen+0.1 U Thrombin+150 μM molecules' mixture; and (4) 0.9 mg/ml Fibrinogen+0.1 U Thrombin+300 μM (of each) molecules' mixture. (3B-3C) Atomic force microscopy images of fibrillar aggregates in the presence of the molecules' mixture (300 μM; 3B) or with fibrinogen and thrombin alone (3C).
Figure 3B:
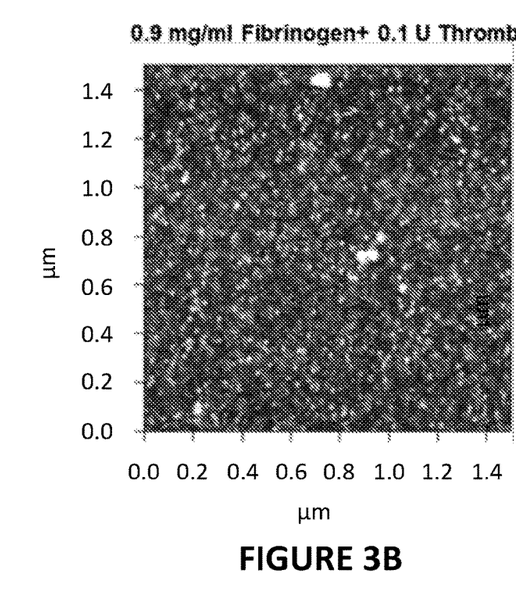
Figure 3C:
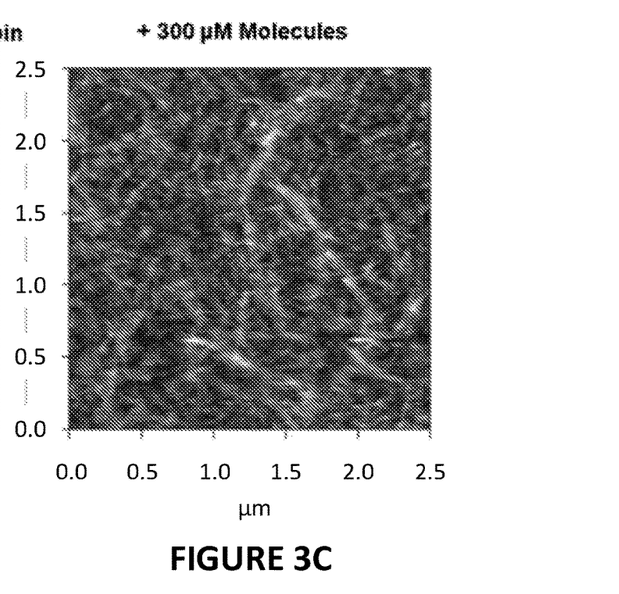

In an in vitro clotting (turbidity) assay, the enzyme thrombin cleaves fibrinogen, resulting in the formation of the fibrin network (Wolberg et al., 2008). This fibrin clot formation causes scattering of light passing through the solution, thereby resulting in increased turbidity (FIG. 3A; the bars on the left-hand side, showing the result of 0.9 mg/mL fibrinogen+0.1 U Thrombin). When the fibrinogen was incubated in the presence of molecules mixture in a concentration of 300 μM (FIG. 3A; the bars on the right-hand side, showing the result of 0.9 mg/mL fibrinogen+0.1 U Thrombin+300 μM molecules mixture), the fibrin clot turbidity significantly increased, with the results reaching twice the maximum height of the turbidity of fibrinogen and thrombin alone. Following the turbidity assay results, fibrin clots were prepared in the presence or absence of molecules' mixture (300 μM) as described in methods section. Under the experimental conditions presented herein, AFM images results demonstrated that the presence of molecules' mixture had accelerate the formation of fibrillar aggregates (FIG. 3B) compared to fibrinogen and thrombin alone (FIG. 3C) which in turn led to an increased turbidity, possibly attributed to the formation of a fibrin clot.

Figure 6:
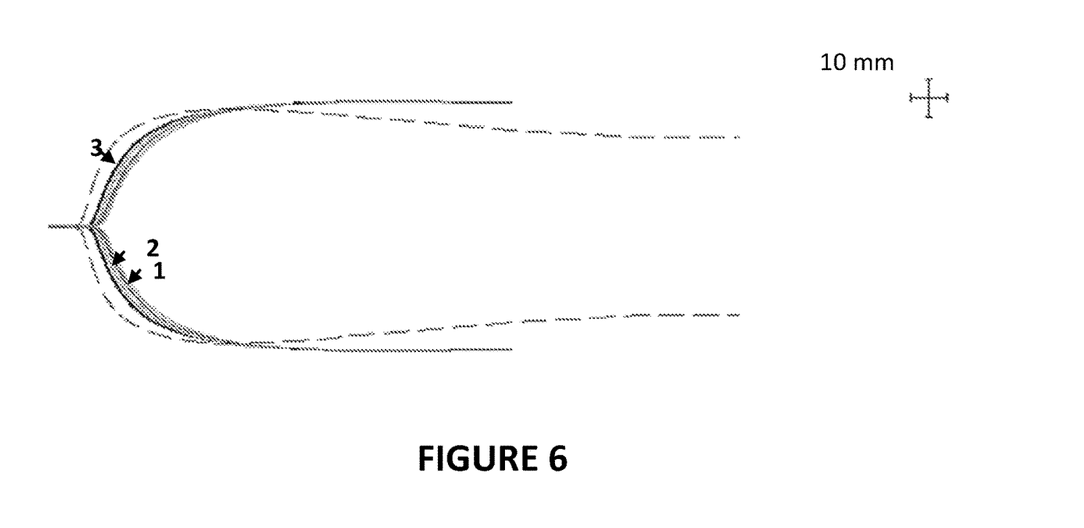
FIG. 6 includes TEG curves showing the effects of the studied molecules (Tryptophol acetate and Tyrosol acetate) on the clotting of a hemophilic subject's blood as tested by TEG assays. Representative TEG curves of TBS-control (1), molecules' mixture at a concentration of 1,200 μM of each compound (2), molecules' mixture at a concentration of 800 μM of each compound (3), and normal tracing (dashed line). Further parameters are provided in Table 4.

To check whether supplementation of the molecules' mixture effectively improves clotting parameters in patients suffering from a disease characterized by dysfunctional blood clotting, the inventors examined the coagulating effect of the current molecules' mixture on whole blood samples obtained from hemophilia patients. The results showed that in the presence of the molecules' mixture, in both of the examined concentrations, there was a positive effect of repairing the disease damage in the context of coagulation (FIG. 6 and Table 4). Specifically, the coagulation parameters were increased by 12% with the molecules' mixture treatment in concentration of 800 μM with a shorter clot reaction time (R), a shorter clotting time (K); and faster kinetics of clot formation (α angle). No significant effect on clot maximum strength (MA) was observed compared to the control. Further, it is important to stress here that this substantial effects was induced on top of the anti-hemophilic treatment already provided to the subject, which further highlights the potency and relevancy of the herein disclosed molecules' mixture in rectifying blood coagulation.

TABLE 4

Clotting parameters of a hemophilic subject's (TEG analysis)

|  | R min | K min | α degree | MA mm | A mm | CI |
|---|---|---|---|---|---|---|
| 203&180; 800 μM each | 7.3 | 2.0 | 61.7 | 63.1 | 63.4 | −0.9 |
| 203&180; 1,200 μM each | 8.1 | 1.9 | 62.2 | 63.0 | 63.7 | −1.4 |
| Control | 8.3 | 2.3 | 57.8 | 63.0 | 64.0 | −2.0 |

All in all, it is suggested herein to use a mixture of Tryptophol derivative (e.g., Tryptophol acetate) and a 4-Ethyl-Phenol derivative (e.g., Tyrosol acetate) to treat a subject in need of blood coagulation rectification. As shown herein, this balancing combination effectively: (1) increased blood coagulation parameters in a subject in need of such increasing, e.g., hemorrhaging or hemophilia; and (2) reduced blood coagulation parameters in a subject in need of such reduction, e.g., in the case of diabetes.

Example 3

A Combination of Tyrosol Acetate and Tryptophol Acetate for Inhibiting Cell Migration A scratch assay is performed so as to show that a combination of tryptophol acetate and tyrosol acetate as disclosed herein is sufficient for inhibiting cell migration, and therefore is therapeutically relevant in the context of tumorigenesis.

Briefly, HeLa cells ($3 \times 10^5$ cells/well) are seeded in 24-well plates to grow in a monolayer for 24 h. The cells are conditioned with tryptophol acetate and tyrosol acetate solution each in a concentration of 200-400 μM. Then a sterile 20-200 μL pipette tip is held vertically to scratch a cross in each well. The detached cells are removed by washing with 500 μL PBS. Five hundred (500) μL of fresh medium with or without diluted samples is added afterwards and incubated for 72 h. Before the image acquisition, the plate is washed with 500 μL pre-warmed PBS and gently shaken for 30 s. Then, pre-warmed medium or sample is added again, and pictures are taken. The dynamics of the scratch closure are monitored and imaged in 24 h intervals using a Keyence BZ-9000 microscope (Keyence, Neu-Isenburg, Germany) at 4× magnification and 1/3,700 s exposure time.

While certain features of the invention have been described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for modulating blood coagulation in a subject in need thereof, comprising administering to said subject a therapeutically effective amount of a composition comprising a Tryptophol acetate, and a Tyrosol acetate, in a ratio ranging from 4:1 (w/w) to 1:4 (w/w), thereby modulating blood coagulation in the subject.

2. The method of claim 1, wherein said modulating comprises reducing blood coagulation in the subject.

3. The method of claim 2, wherein said reducing blood coagulation comprises increasing the clot reaction time, respectively, in said subject, compared to control.

4. The method of claim 2, wherein said reducing blood coagulation is in a subject being afflicted with a disease characterized by increased risk for developing blood clots.

5. The method of claim 4, wherein said disease comprises diabetes.

6. The method of claim 1, wherein said composition is a pharmaceutical composition or a nutraceutical composition.

7. The method of claim 1, wherein said Tryptophol acetate, and Tyrosol acetate are present in said composition in a molar ratio) of 1:1 (w/w).

* * * * *